United States Patent [19]
Johnson et al.

[11] Patent Number: 5,455,768
[45] Date of Patent: Oct. 3, 1995

[54] SYSTEM FOR DETERMINING VEHICLE SPEED AND PRESENCE

[75] Inventors: Ronald P. Johnson, Pueblo; Daniel W. Sines; Darrell E. Emery, both of Colorado Springs, all of Colo.

[73] Assignee: Safetran Traffic Systems, Inc., Colorado Springs, Colo.

[21] Appl. No.: 972,798

[22] Filed: Nov. 6, 1992

[51] Int. Cl.$^6$ ............................. G06F 15/16; G08G 1/02
[52] U.S. Cl. .................. 364/424.01; 364/438; 324/238; 340/936; 340/941
[58] Field of Search ............... 364/424.01, 436, 364/437, 438, 561, 569; 324/244, 174, 160, 200, 161, 177, 178; 340/933–936, 943, 941; 310/19, 20, 26, 155; 335/7, 20, 220, 290, 295; 73/862

[56] References Cited

U.S. PATENT DOCUMENTS

| | | | |
|---|---|---|---|
| 3,775,742 | 11/1973 | Koerner et al. | 340/938 |
| 3,868,626 | 2/1975 | Masher | 340/929 |
| 3,944,912 | 3/1976 | Angel et al. | 324/41 |
| 4,234,923 | 11/1980 | Eshraghian et al. | 364/436 |
| 4,251,797 | 2/1981 | Bragas et al. | 340/905 |
| 4,268,771 | 5/1981 | Lace | 310/155 |
| 4,361,202 | 11/1982 | Minovitch | 180/168 |
| 4,379,280 | 4/1983 | Eshraghian et al. | 340/38 L |
| 4,445,088 | 4/1984 | Schübel | 324/238 |
| 4,449,115 | 5/1984 | Koerner | 340/941 |
| 4,529,982 | 7/1985 | Karlstrom et al. | 340/991 |
| 4,651,565 | 3/1987 | Keene | 73/505 |
| 4,862,163 | 8/1989 | Sobut | 340/940 |
| 4,968,979 | 11/1990 | Mizuno et al. | 340/941 |
| 5,008,666 | 4/1991 | Gebert | 340/936 |
| 5,278,555 | 1/1994 | Hoekman | 340/941 |

OTHER PUBLICATIONS

Xue et al., "S Low Cost Stator Flux Oriented Voltage Source Variable Speed Drive", IEEE 1990, pp. 410–415.

*Primary Examiner*—Kevin J. Teska
*Assistant Examiner*—Tan Q. Nguyen
*Attorney, Agent, or Firm*—Beaton & Folsom

[57] ABSTRACT

A system for monitoring ferromagnetic materials in proximity to a sensing region, which is particularly applicable to traffic monitoring and controlling. A magnetic probe generates a signal in response to magnetic flux changes caused by a vehicle moving through a sensing area. A processor analyzes the signal to determine the duration of the signal and correlates that duration to a vehicle velocity. A checking system periodically sends a checking signal to the magnetic probe and monitors the return signal to verify that the probe is operative and also analyzes the return signal to determine whether a stationary vehicles is in the sensing area.

10 Claims, 3 Drawing Sheets

SYSTEM FOR DETERMINING VEHICLE SPEED AND PRESENCE

FIELD OF THE INVENTION

The present invention relates to systems for determining the presence of a vehicle in a traffic stream and for determining the speed of that vehicle. In particular, the present invention relates to such a system utilizing a magnetic probe to detect vehicle-induced changes in magnetic flux and to generate an electrical signal indicative of the flux change, and a microprocessor to convert the signal from analog to digital form and to analyze the digitized signal profile to determine vehicle speed.

BACKGROUND OF THE INVENTION

Traffic control systems generally include devices for monitoring a roadway for determining vehicle traffic flow on particular routes, along with devices for controlling traffic signals in response to the determined traffic flow. Ideally, the systems determine the presence of each moving vehicle on the monitored roadway, the speed of that vehicle, and the presence of a stopped vehicle. From that information, together with other desired information such as road conditions, traffic on intersecting roadways and other routes, and other measurable parameters, the system can control traffic signals to optimize traffic flow and to determine traffic patterns and needs.

A common device for installation in a roadway to determine traffic flow is a "loop". A loop is a loop of electrically conductive wire measuring roughly six feet by six feet which is buried in the roadway and connected to a resonant circuit. The wire carries an alternating current whose frequency is related to the inductance. The presence of a ferromagnetic material such as a vehicle causes the loop inductance to change which in turn causes the frequency of the resonant circuit to change in a detectable and predictable way.

Loop systems have several drawbacks. One drawback is that the resolution of the detector is limited by the relatively large size of the loop of wire. Another drawback is the difficulty and expense of installing the loop of wire. Installation of the loop of wire generally entails saw-cutting a slot into the roadway in a rectangular pattern, carefully placing the loop wire into the slot, and then filling and sealing the slot with epoxy, rubber or other suitable (and typically inconvenient) material. The sealing step is both important and difficult because the sealing is to fix the loop in place to prevent any horizontal or vertical movement of the buried wires so there are not spurious signals due to wire movement. It is also to prevent water from reaching the wires, which could change the loop inductance. Another drawback to loop systems is that their performance is affected by the quality of the roadway. Irregularities or fractures in a paved road may produce false signals in a loop system, and a loop system is generally not feasible at all on a gravel or other unpaved surface. Another drawback is that the saw cuts in the pavement that are required for the installation of the loop wire immediately damages the pavement and leads to further long-term damage by weakening the roadway and creating a point for further wear and water accumulation from frost, erosion, snowplows, chemicals and traffic.

Due to these difficulties in installing the wire of a loop system and the weakening of the pavement associated with the installation, the life of the loop wire is much shorter than desired. When the wire fails it must be replaced, again at considerable time and expense, and the replacement requires closing at least one traffic lane. The replacement wire will likely be no more reliable or long-lived than the wire it replaced.

Another approach to detecting vehicles is by the use of magnetic probes, or "magnetometers", such as those described in U.S. Pat. No. 4,449,115 by Koerner and U.S. Pat. No. 3,984,764 by Koerner, the contents of both of which are hereby incorporated by reference. A magnetometer is a device to detect irregularities in the flux of the earth's magnetic field caused by nearby ferromagnetic materials. The earth's magnetic field normally produces fairly uniformly spaced flux lines within a small surveillance area. However, a ferromagnetic material has a lower path of reluctance for the flux lines, which causes the flux lines to warp so that more lines and a higher density of lines pass through the material as it occupies a given space than pass through the same space not occupied by the material. The electrical windings of the magnetometer detect and measure these irregularities in magnetic flux density.

Magnetometers are preferred over loop systems because magnetometers are small, with a length of less than two feet and a diameter of no more than a few inches. Therefore, the magnetometer can be installed in a conduit that is permanently built under the roadway. The conduit can be accessed by a manhole cover or other suitable means, so that the installation and replacement of the magnetometer is a fairly simple matter that requires no roadwork.

A disadvantage to the use of both loop systems and magnetometers is that they readily detect passing vehicles, but they do not readily compute the speed of that vehicle. In order to compute the speed of a vehicle, it is generally necessary to space a pair of loops along the roadway to measure the time between detection of the vehicle at the first loop and detection of the vehicle at the second loop, and then compute the vehicle speed by dividing the spacing distance by the elapsed time. Of course, having two loops rather than just one increases the trouble, time and expense of installing and maintaining the system.

Several systems have attempted to obtain information about the speed of a vehicle from a single detector. For example, U.S. Pat. No. 4,379,280 by Eshraghian describes a vehicle detector wherein the envelope of a received continuous wave signal is analyzed to predict the speed of a passing vehicle. In U.S. Pat. No. 4,862,163 by Sobut, there is described a speed detector employing a pressure transducer which generates a signal in response to the weight of a passing vehicle. A long signal indicates a slow-moving vehicle while a short signal indicates a faster-moving vehicle. Other art in the field includes U.S. Pat. No. 4,862,162 by Duley (which includes a calibration procedure to account for environmental changes); U.S. Pat. No. 4,430,636 by Bruce; U.S. Pat. No. 4,968,979 by Mizumo; U.S. Pat. No. 4,916,621 by Bean; U.S. Pat. No. 4,368,428 by Djikman; U.S. Pat. No. 4,358,749 by Clark; U.S. Pat. No. 4,075,553 by Bouverot; U.S. Pat. No. 4,232,285 by Narbaits-Jaureguy; U.S. Pat. No. 3,944,912 by Angel; and U.S. Pat. No. 5,008,666 by Gebert. In none of this art is there a system for determining the speed of a passing vehicle by analyzing the profile of a digitized signal generated by a magnetic probe and for determining the presence of a stopped vehicle in the manner of the present invention.

SUMMARY OF THE INVENTION

The present invention is a system for analyzing the signal generated by a magnetic probe to determine the presence and speed of a passing vehicle. The signal is generated by the magnetic probe in response to the magnetic flux variations caused by the ferromagnetic and electromagnetic elements of the passing vehicle, the signal is converted from analog to digital form using an analog to digital converter, and the speed of the vehicle is determined by analyzing the profile of the digitized signal such as the slope of the leading and/or trailing edge of the signal or the dwell time of the signal between the leading and trailing edge. The system can distinguish between long and short vehicles by comparing the length of dwell time and the length of the leading and trailing edge, and the ratios of those lengths, against expected lengths and ratios for vehicles of given lengths.

The signal analysis can be performed locally with a processor proximate the magnetometer or remotely after transmitting the signal to another location. A serial communications port may be included to transmit information to a central computer or a network for storage or further analysis or the information may be transmitted to a traffic signal controller.

The system also has a process for periodically checking whether the magnetic probe is operational by applying a signal to the probe and monitoring the probe response.

The presence of a stationary vehicle can also be determined by detecting electromagnetic signals produced by the alternator or other electrical components of the vehicle.

DETAILED DESCRIPTION OF THE INVENTION

Figure 1:
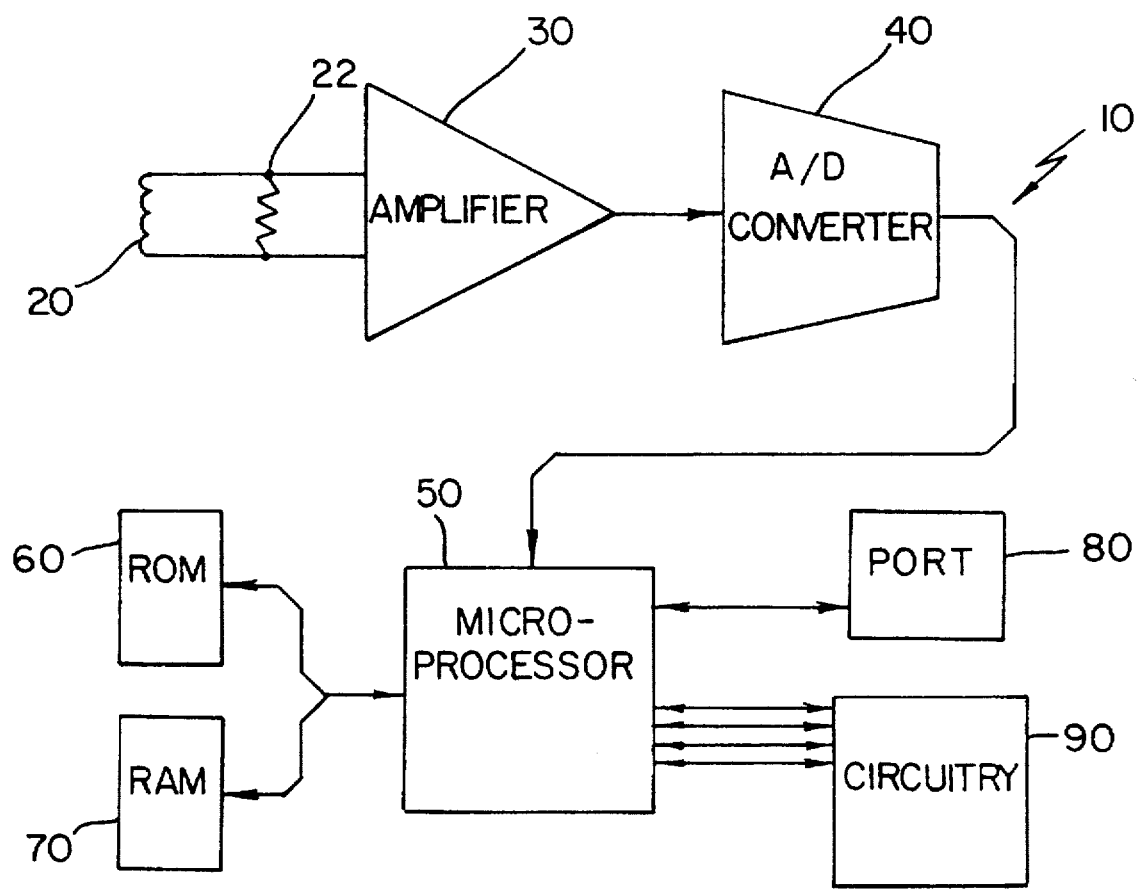
FIG. 1 shows a schematic diagram of the present invention.

The principal elements of the invention 10 are shown in FIG. 1 and include a magnetic probe 20, an amplifier 30, an analog to digital converter 40, a microprocessor 50, a read-only memory 60 and a random access memory 70 in communication with the microprocessor, a serial port 80 for the microprocessor 50, and support circuitry 90.

The magnetic probe 20 is of a type known in the art. Briefly, it includes a coil of wire with a suitable number of turns (such as about 10,000–30,000) around a ferromagnetic core such as iron or ferrite. The magnetic probe may be placed directly in the ground or may be installed in a conduit placed in the ground which is accessible through a manhole cover or other suitable access means. The magnetic probe may be oriented in any manner that produces a desirable signal response. For example, it is possible in certain installations that magnetic probes with the longitudinal axis of the core oriented vertically may produce a desirable directional signal response. Several magnetic probes may be wired in series and spaced along a sensing region to cover a broader area. It is common practice for the magnetic probes to be buried about a foot beneath the roadway and for each magnetic probe or each set of magnetic probes wired in series to be arranged to respond to a sensing area corresponding to one traffic lane.

The magnetic probe 20 includes a resistor 22 to produce a voltage across the probe. The undisturbed flux of the earth produces no current in the magnetic probe. As a ferromagnetic material such as a vehicle passes through the sensing area of the magnetic probe 20, the flux of the earth is disturbed as the flux tends to concentrate in the material. The changing flux produces a weak current through the magnetic probe which results in a voltage across the resistor 22 and the probe 20. The voltage is amplified by a class A amplifier 30. The amplified signal output is fed into the high speed analog to digital converter 40 which digitizes the signal and the digitized signal is fed from there to the microprocessor 50.

Figure 2:
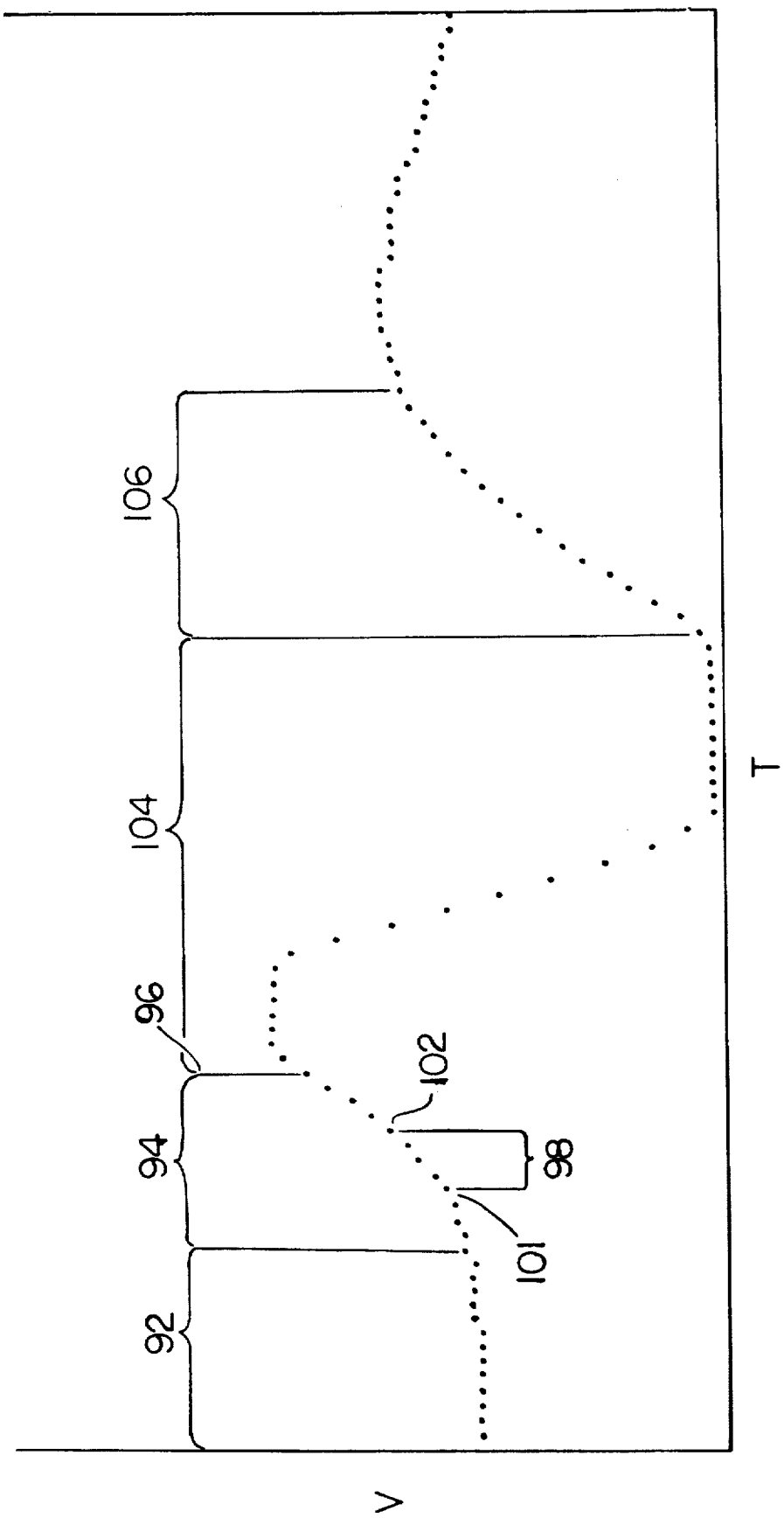
FIG. 2 shows a diagram of a digitized signal generated by the magnetic probe in response to a passing vehicle.

A digitized signal is represented in FIG. 2, in which signal voltage V is plotted against time T. The signal typically includes an introductory portion 92 in which the voltage changes relatively slowly as a vehicle approaches the magnetic probe. When the vehicle becomes close to the magnetic probe, this slowly changing voltage begins to change much faster, and the faster changing signal forms the leading edge 94 of the signal. The voltage peaks as the vehicle passes the magnetic probe at point 96 and then the voltage decreases. The voltage then varies over the period represented as segment 104. Although the voltage in segment 104 is depicted as a fairly smooth curve in FIG. 2, in fact the voltage over this segment can be expected to move up and down considerably due to various elements of the vehicle passing over the probe such as the engine, alternator, transmission and rear axle and differential. The voltage then returns to normal as shown in segment 106 of FIG. 2.

In the example shown in FIG. 2, the voltage is saturated as the vehicle passes the magnetic probe at point 96 and again after the voltage moves the other way, and this is the reason for the upper and lower voltage plateaus. The true signal would show a spike in each of those places. However, it may not be necessary to use the portion of the signal where the saturation plateaus obscure the signal spikes, although that portion could certainly be used if desired. Alternatively, the saturation plateau may be used in the manner explained below.

As previously explained, ferromagnetic materials passing through the sensing area produce flux disturbances. However, those flux changes are not instantaneous; they enter the sensing area at a rate that bears a relation to the speed of the ferromagnetic material that produces them, they leave the sensing area at a rate that bears a relation to that speed, and the duration of them bears a relation to that speed. Therefore, the rate and duration that the flux disturbance manifests itself can be used to predict the velocity of the passing ferromagnetic material.

It has been found that for relatively fast-moving vehicles such as those moving faster than about 20 miles per hour, the speed of the vehicle is inversely proportional to the length of time represented by the leading edge 94, the dwell time 104 and the trailing edge 106 on the voltage plot. Therefore, the system can be programmed to calculate the sum of those three times and then correlate that sum with a speed, either with a separate calculation or by reference to a "look-up" table in the microprocessor memory. The calculation of the speed as a function of this sum of the time of the leading edge, the dwell time and the trailing edge can be expressed as:

$$V=K/(A+B+C)$$

where:

V is speed

K is an empirical constant

A is the duration of the leading edge

B is the duration of the trailing edge

C is the duration of the dwell time

It has been found that under about 20 miles per hour the duration of the leading edge and trailing edge become fairly insignificant in relation to the duration of the dwell time. For under 20 miles per hour, the speed is therefore calculated using a different constant K, such as a constant one-half of the constant K used in the calculation for speeds of over 20 miles per hour. It may also be found that in a given system under a given installation that more than two constants are desirable for various speed ranges. If a look-up table is used that is determined empirically rather than by calculating the speed using a calculation, then this adjustment to the constant will have been automatically considered in the establishment of the look-up table.

One of the difficulties encountered with the system described above which determines the speed of a vehicle based on the time the electromagnetic flux is distorted at the probe, is that it fails to consider the length of the vehicle. It can be appreciated that a long vehicle will produce a change in the electromagnetic flux for a longer period of time than a short vehicle traveling at the same speed. Therefore, unless the differences in length are considered, the system will tend to determine a slower speed for the longer vehicle since the determined speed is inversely proportioned to the duration of the flux change.

This difficulty is relatively insignificant for automobiles, because the vast majority of automobiles fall within a fairly small range of lengths. Almost all automobiles are between 13 and 17 feet long, and most are quite close to 15 or 16 feet long. Therefore, the sum of the duration of the leading edge, trailing edge and dwell time will be within about 10% for most vehicles. A change of plus or minus 10% in the measured duration of electromagnetic flux change will result in, for example, a change of only plus or minus 3 miles per hour for a vehicle moving at 30 miles hour and a change of only plus or minus 6 miles per hour for a vehicle moving at 60 miles per hour. This is a range that is acceptable in the traffic control systems for which the invention is intended, and is even within the accuracy of most existing traffic enforcement systems such as radar detectors.

The more severe difficulty arises when a vehicle other than an automobile passes the probe, such as a long truck or a tractor-trailer. Such a vehicle may be several times longer than an automobile, and so a failure to account for the extra length would result in a grossly distorted speed determination. The system addresses this difficulty by first making a determination whether the vehicle is extra-long or not. This can be done in a variety of ways or combinations of ways. One main way is to measure the magnitude of the voltage change in order to determine the amount of electromagnetic flux change. Because extra-long vehicles like trucks and tractor trailers tend to be very massive, they also tend to be very effective concentrators of flux and produce high voltage changes in the probe. Another method of determining whether the vehicle is long is to compare the duration of the leading and trailing edges against the duration of the dwell time. Surprisingly, a vehicle moving fast tends to produce longer leading and trailing edge times in relation to the same vehicle moving slowly, while the dwell time tends to vary inversely with the speed. Therefore, a given sum of the duration of the trailing edge and the dwell time can be identified as representing either a normal vehicle at one speed or an extra-long vehicle at a faster speed, by examining the ratio between the dwell time and the sum of the duration of the leading edge and the trailing edge. Mathematically this comparison can be expressed as:

$$R = C/(A+B)$$

where:

R is the ratio of dwell time to sum of leading edge time and trailing edge time

A is the duration of the leading edge

B is the duration of the trailing edge

C is the dwell time

A larger value for R tends to indicate a longer vehicle travelling at a slower speed while a smaller value for R tends to indicate a shorter vehicle travelling at a faster speed. Yet another method is to compare the speed of the vehicle as determined by assuming that the vehicle is either of normal length or is extra-long, against the speeds of vehicles immediately preceding it and following it. If the speed as determined under one of these assumptions is dramatically different from the speed of a vehicle that is either right in front or right behind that vehicle, then the assumption is probably wrong since vehicles travelling closely together in a line tend to travel at about the same speed. The speed can then be re-calculated using the opposite assumption about vehicle length.

Table 1 shows the results of an actual experiment in determining the speed of vehicles travelling down a road with an implanted probe in accordance with the present invention. Several noteworthy points can be gleaned from Table 1 which illustrate some of the discussion above. One is that vehicles close together tend to travel at about the same speed, and this principle can be used as a check on the speed. For example, vehicles 13 and 14 are separated by only about 3 seconds, and so it is unsurprising that the speed calculated for those vehicles are relatively close (33 and 25 miles per hour, respectively) and a great difference in calculated speeds would suggest an error in the length assumption or some other calculation parameter. In contrast, the speed of vehicle 5 is calculated at 62 miles per hour, while the speed of vehicle 4 is calculated at 39 miles per hour and the speed of vehicle 6 is calculated at 20 miles per hour. However, vehicle 4 passed 18 seconds earlier than vehicle 5 and vehicle 6 passed 15 seconds later than vehicle 5, and so it is possible that the calculated speed of 62 miles per hour for vehicle 5 is not erroneous.

TABLE 1

| Vehicle Number | Start Time | A Time | B Time | C Time | Speed | C/(A + B) | Peaked Time |
| --- | --- | --- | --- | --- | --- | --- | --- |
| 1 | 3.610s | 0.150s | 0.200s | 0.260s | 33mph | 0.74 | 0.040s |
| 2 | 4.990s | 0.130s | 0.160s | 0.250s | 38mph | 0.36 | 0.070s |
| 3 | 12.490s | 0.220s | 0.160s | 0.290s | 30mph | 0.76 | 0.000s |
| 4 | 24.450s | 0.110s | 0.110s | 0.300s | 39mph | 1.36 | 0.000s |
| 5 | 42.470s | 0.080s | 0.100s | 0.150s | 62mph | 0.83 | 0.030s |
| 6 | 57.410s | 0.210s | 0.160s | 0.630s | 20mph | 1.70 | 0.000s |
| 7 | 60.840s | 0.110s | 0.130s | 0.630s | 23mph | 2.63 | 0.000s |
| 8 | 73.870s | 0.210s | 0.210s | 0.520s | 22mph | 1.24 | 0.070s |

TABLE 1-continued

| Vehicle Number | Start Time | A Time | B Time | C Time | Speed | C/(A + B) | Peaked Time |
|---|---|---|---|---|---|---|---|
| 9 | 75.720s | 0.130s | 0.410s | 0.510s | 19mph | 0.94 | 0.000s |
| 10 | 77.670s | 0.150s | 0.240s | 0.410s | 25mph | 1.05 | 0.010s |
| 11 | 79.620s | 0.420s | 0.200s | 0.230s | 24mph | 0.37 | 0.060s |
| 12 | 81.160s | 0.080s | 0.290s | 0.340s | 29mph | 0.92 | 0.020s |
| 13 | 92.160s | 0.140s | 0.150s | 0.320s | 33mph | 1.10 | 0.120s |
| 14 | 95.650s | 0.090s | 0.110s | 0.620s | 25mph | 3.10 | 0.050s |
| 15 | 101.390s | 0.150s | 0.110s | 0.190s | 45mph | 0.73 | 0.110s |
| 16 | 130.990s | 0.210s | 0.210s | 0.680s | 19mph | 1.62 | 0.040s |
| 17 | 141.830s | 0.170s | 0.180s | 0.210s | 36mph | 0.60 | 0.000s |
| 18 | 161.810s | 0.130s | 0.100s | 0.220s | 45mph | 0.96 | 0.090s |
| 19 | 180.600s | 0.090s | 0.090s | 0.220s | 51mph | 1.22 | 0.040s |
| 20 | 189.780s | 0.160s | 0.150s | 0.260s | 36mph | 0.84 | 0.170s |
| 21 | 195.550s | 0.150s | 0.370s | 0.540s | 19mph | 1.04 | 0.000s |
| 22 | 208.600s | 0.150s | 0.540s | 0.460s | 18mph | 0.67 | 0.000s |
| 23 | 210.250s | 0.160s | 0.140s | 0.450s | 27mph | 1.50 | 0.000s |
| 24 | 212.440s | 0.220s | 0.190s | 0.450s | 24mph | 1.10 | 0.060s |
| 25 | 219.650s | 0.130s | 0.090s | 0.210s | 47mph | 0.95 | 0.010s |
| 26 | 229.530s | 0.200s | 0.310s | 0.370s | 23mph | 0.73 | 0.000s |
| 27 | 236.020s | 0.110s | 0.080s | 0.200s | 52mph | 1.05 | 0.000s |

Another point is illustrated by reference to the "Time Peaked" column and ratio C/(A+B) column. Vehicle 14 shows a ratio C/(A+B) of over 3, while the same ratio for other vehicles is around 1 or less. This suggests that the vehicle may be an extra-long vehicle such as a truck or tractor-trailer travelling at a relatively slow speed rather than the alternative of a normal vehicle travelling at a fast speed. Examination of the "Time Peaked" column indicates that the voltage was "peaked" for 0.050 seconds. By "peaked" is meant that the voltage was in excess of some threshold. The 0.050 seconds of peak voltage is somewhat high in comparison to the Time Peaked for other vehicles. Because the voltage level is proportional to the flux change, this high period of peak voltage implies a massive flux-concentrating vehicle as commonly found in extra-long vehicles such as trucks and tractor-trailers.

Other information may be gained from the profile of discrete portions of the voltage profile such as the leading edge portion 94 or the trailing edge portion 106. In particular, the slope of the leading edge and trailing edge may contain useful information relating to the speed and size of the vehicle.

Once a figure is established for the duration of the leading edge, trailing edge and dwell time, those figures can be processed to determine whether the vehicle is normal or extra-long and then the information compared by the microprocessor against velocity information entered in the read-only-memory 60. Once the comparison establishes a velocity corresponding to that figure, that velocity can be communicated to the support circuitry 90 for display or further processing, can be entered in the random-access memory 70, or can be transmitted through the serial port 80 to a remote master location.

The calibration of the device can be accomplished by passing one or more vehicles through the sensing area at known speeds and adjusting the speeds determined by the device to match the known speeds. The duration of the signal may not be in linear proportion to the speed of the passing vehicle, and so it is necessary to pass several vehicles at different speeds and to process the signal obtained in order to obtain an accurate calibration.

The device can be used in the manner described above to generate information concerning both whether a vehicle passes the sensing area and the velocity of that vehicle. That information can be used to control individual traffic signals in the locale of the sensor in the manner known in the art and can also be transmitted to remote locations for use alone or together with similar information from other devices to control, monitor and record traffic and traffic patterns and conditions in small and large regions and systems.

Figure 3:
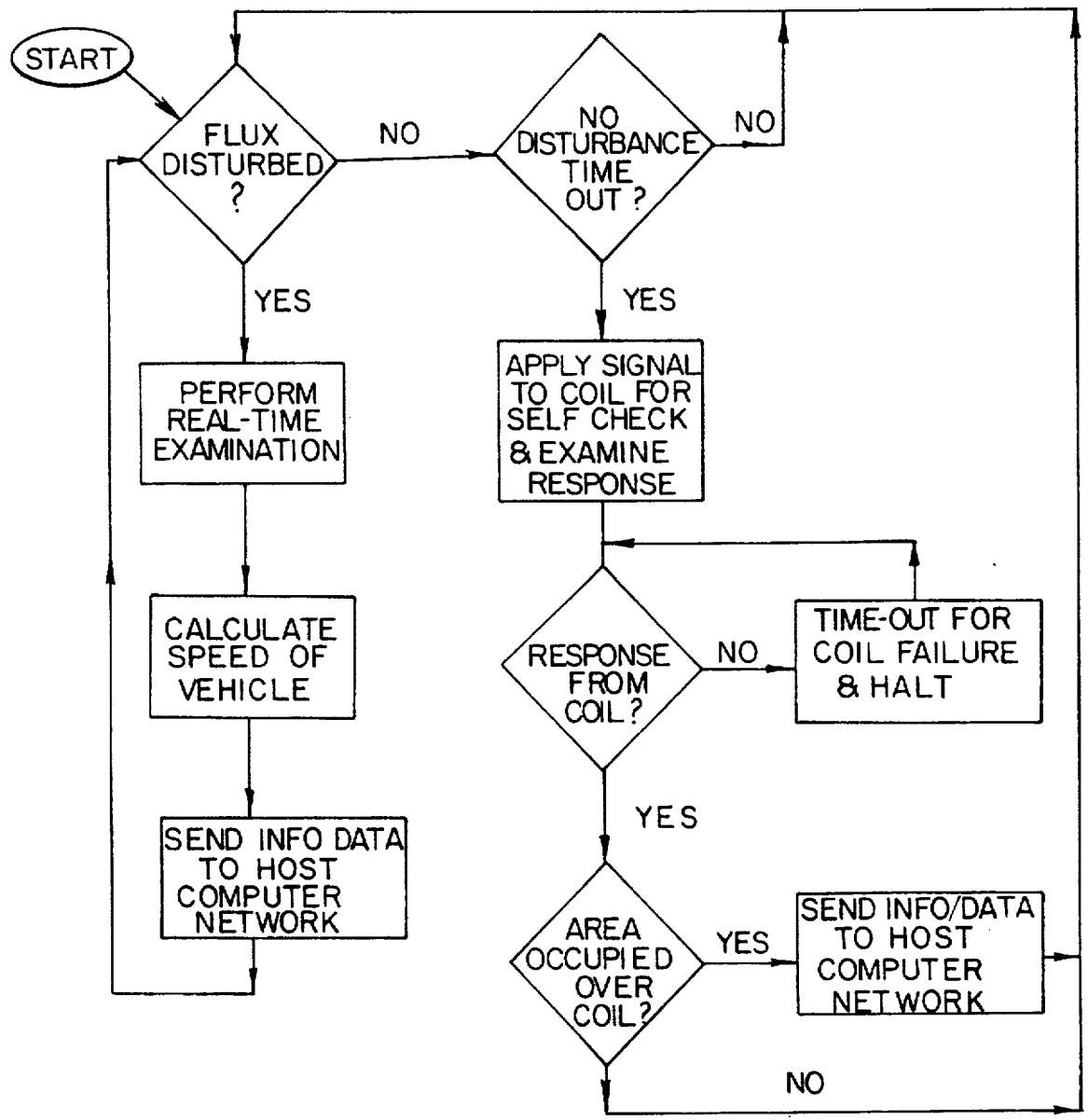
FIG. 3 shows a flow chart diagram of the process of the present invention.

The device can also be used to determine the presence of a stationary vehicle in the sensing area. Determining the presence of a stationary vehicle in the sensing area is an important capability because, without it, there is difficulty in distinguishing between the total absence of traffic and traffic that is so heavy that it is at a standstill. One simple way to determine whether there is a stationary vehicle over the probe is to determine whether there is a small cyclical change in the voltage in the probe which would represent the operation of an alternator or other electromagnetic device in a vehicle. Another way is shown in FIG. 3. The flow chart of FIG. 3 begins with the query whether the flux is disturbed to the point where the voltage exceeds the lower threshold. If so, then the machine performs the analysis already described, in examining the profile of the signal to determine the velocity of the vehicle by comparing that determined time against a library of calculated times, sending that information to a host computer network or to some other desired device for appropriate use such as a signal controller, and then waiting for the next passing vehicle by returning to the query whether the flux is disturbed.

If the flux is not disturbed upon query, then the machine inquires whether a predetermined period of time has elapsed since the last flux disturbance was sensed and processed. If not, then the machine returns again to the query whether the flux has been disturbed and those two queries are repeated until the time elapsed since the last flux disturbance exceeds the predetermined period. The predetermined period may be programmable based on expected traffic flow conditions and may be programmed to vary depending on day and time. It may vary from seconds or less to hours or even more.

Once the query of whether the period of time elapsed since the last flux disturbance was sensed exceeds the predetermined period is answered in the affirmative, the machine applies a signal to the coil of the magnetic probe to conduct a "self-check". The response elicited determines whether the device is operating properly. If the signal applied to the coil fails to produce a coil response in the form of a voltage change, then the device is assumed to be inoperative due to a faulty connection or wire break or other cause. In that event, a signal is sent to the host computer network or other location for appropriate action such as the transfer of traffic signal controllers to a default mode, the implementation of a back-up system and the dispatching of a repair crew.

It can therefore be appreciated that the system can determine whether a vehicle passes the sensing area, the speed of a vehicle passing the sensing area, whether there is a stationary vehicle in the sensing area, and whether the device is operative. All of this information may be needed for effective and efficient traffic control.

We claim:

1. A system for monitoring traffic comprising:

a magnetic probe to produce an electrical signal in response to changes in magnetic flux in a sensing area caused by a vehicle in the sensing area, the electrical signal having a beginning and an end;

means for digitizing the electrical signal;

means for analyzing the digitized signal to determine the duration of the electrical signal by measuring an elapsed time from said beginning of the electrical signal to said end of the electrical signal; and means for determining the speed of the vehicle from said duration of the electrical signal wherein the means for determining the speed of the vehicle includes a digital processor having a memory with calibration information, the calibration information including a duration of an electrical signal caused by a vehicle having a known speed for comparison with said determined duration of the electrical signal.

2. The system of claim 1, wherein the calibration information includes a duration of electrical signals caused by vehicles having a plurality of different known speeds.

3. The system of claim 1, wherein the magnetic probe is installed at an installation site and the calibration information includes information concerning the installation site of the magnetic probe.

4. The system of claim 1, further comprising means for checking the operativeness of the magnetic probe.

5. The system of claim 4, wherein said checking means includes means for transmitting an electrical signal to the magnetic probe and for receiving an electrical signal from the magnetic probe in response to the transmitted signal.

6. The system of claim 1, further comprising means for checking whether a stationary vehicle is in the sensing area.

7. The system of claim 6, wherein said checking means includes means for comparing the electrical signal to a signal indicative of the absence of a vehicle in the sensing area.

8. A method for determining the speed of a ferromagnetic material having a known estimated speed, in relation to a speed detector containing a magnetic probe, which changes a magnetic flux passing through the detector, comprising the steps of:

producing an electrical signal by a change in the magnetic flux passing through the detector, the electrical signal having a beginning and an end and a leading edge having a leading edge duration and a trailing edge having a trailing edge duration;

digitizing the electrical signal, measuring an elapsed time from said beginning of the electrical signal to said end of the electrical signal to determine the duration of the change in the magnetic flux; and determining the speed of the ferroelectric material in relation to the speed detector utilizing a first formula if the estimated speed is within a first speed range, wherein said first formula includes a sum of the duration of the leading edge and the duration of the trailing edge.

9. The method of claim 8, further comprising determining the speed of the ferroelectric material in relation to the speed detector utilizing a second formula if the estimated speed is within a second speed range and wherein the second formula includes a ratio of the sum of the leading edge duration and the trailing edge duration to an elapsed time between the leading edge and trailing edge.

10. The method of claim 9, wherein said first speed range is slower than said second speed range.

* * * * *